United States Patent [19]

Hosaka et al.

[11] Patent Number: 5,036,196
[45] Date of Patent: Jul. 30, 1991

[54] SURFACE MICROSCOPE

[75] Inventors: Sumio Hosaka, Tokyo; Shigeyuki Hosoki, Hachioji; Tsuyoshi Hasegawa, Kokubunji, all of Japan

[73] Assignee: Hitachi, Ltd., Tokyo, Japan

[21] Appl. No.: 533,341

[22] Filed: Jun. 5, 1990

[30] Foreign Application Priority Data

Jun. 9, 1989 [JP] Japan .................. 1-145329

[51] Int. Cl.$^5$ .......................................... H01J 37/00
[52] U.S. Cl. .................. 250/306; 250/423 F
[58] Field of Search ............ 250/306, 307, 423 F

[56] References Cited

U.S. PATENT DOCUMENTS

| | | | |
|---|---|---|---|
| 4,343,993 | 8/1982 | Binning et al. | 250/306 |
| 4,747,698 | 5/1988 | Wickramasinghe et al. | 250/306 |
| 4,823,004 | 4/1989 | Kaiser et al. | 250/306 |
| 4,837,435 | 6/1989 | Sakuhara et al. | 250/306 |
| 4,870,352 | 9/1989 | Koechner | 250/306 |

OTHER PUBLICATIONS

Physical Review Letters, vol. 49, No. 1, Jul. 5, 1982, pp. 57-61.

Primary Examiner—Bruce C. Anderson
Attorney, Agent, or Firm—Fay, Sharpe, Beall, Fagan, Minnich & McKee

[57] ABSTRACT

A surface microscope includes a device which brings a probe close to a surface of a sample to scan it therewith for producing a tunnel current between the probe and the sample to measure the superficial shape of the sample by detecting the tunnel current. A device for varying a gap between the probe and the sample, a system for detecting a variable component of the tunnel current varying, accompanied by variations in the gap by the device for varying same, a divider for calculating the ratio of the variable component of the tunnel current to the tunnel current, and a calculator for calculating tunnel barrier information, based on the quotient obtained by the divider, are combined with a display for displaying the measured superficial shape of the sample and the tunnel barrier information thus calculated.

23 Claims, 4 Drawing Sheets

SURFACE MICROSCOPE

BACKGROUND OF THE INVENTION

The present invention relates to a surface microscope utilizing tunnel current or field emission current produced when a probe is brought close to a sample, and in particular to a surface microscope suitable for measuring tunnel barrier (tunneling barrier height), by means of which it is possible to find an interface, at which physical properties change at the neighborhood of the surface of the sample, e.g. an interface between the p type semiconductivity and the n type semiconductivity region at the surface of a semiconductor body, by measuring the tunnel barrier at the surface of the sample.

Heretofore a method for measuring the tunnel barrier by measuring tunnel current or field emission current produced when a probe is brought close to a sample is discussed in Phys. Rev. Lett. 49, 1982, pp. 57–61.

By the prior art technique described above it is disclosed to measure indirectly the value of the square root of the tunnel barrier, using the following equation, to calculate it;

$$\phi^{\frac{1}{2}} = (\ln J_T)/\Delta S \quad (1)$$

That is, $\phi^{\frac{1}{2}}$ can be measured, based on the tunnel current density $J_T$ and variations $\Delta S$ in the gap between the probe and the sample. Between them, $\Delta S$ can be set by vibrating the probe. $J_T$ is obtained by dividing the intensity of the tunnel current by the current emission area. However the emission area is not known at all. Further, the current density $J_T$ is varied also by absolute variations of the gap. Even in the case where a scanning tunneling microscope (STM), which is a kind of surface microscope, is driven in the constant current mode, since erroneous current from about 10% to several tens % is produced, it gives rise to errors of the current density $J_T$. Consequently, there is a problem that, in the prior art it is not possible at all to measure the tunnel barrier ($\phi$), even if Eq. (1) is used.

SUMMARY OF THE INVENTION

The object of the present invention is to provide a surface microscope capable of measuring distribution of the tunnel barrier ($\phi$) at the surface of the sample with a high precision.

In order to achieve the above object, for the present invention, the theoretical formula for the tunnel current of free electron approximation can be expressed by the following equation, as described in the literature stated above;

$$I = k_1 \exp(-K_2 \phi^{\frac{1}{2}} S) \quad (2)$$

By differentiating with respect to S, (2) is transformed into;

$$\frac{dI}{dS} = -k_1 k_2 \phi^{\frac{1}{2}} \exp(-k_2 \phi^{\frac{1}{2}} S) \quad (3)$$
$$= -k_2 \phi^{\frac{1}{2}} I$$

The variation in the current $\Delta I$ when the probe is slightly varied ($\Delta S$) is deduced therefrom, as expressed by the following equation;

$$\Delta I = -k_2 \phi^{\frac{1}{2}} I \Delta S \quad (4)$$

Using this equation, $\phi^{\frac{1}{2}}$ can be expressed, as given by Eq. (5);

$$\phi^{\frac{1}{2}} = -\left(\frac{1}{k_2 \Delta S}\right)\left(\frac{\Delta I}{I}\right) \quad (5)$$

where $k_2$ is a constant given by $$\{(4\pi/h)2m\}^{\frac{1}{2}} = 1.025 \text{ Å}^{-1} ev^{-\frac{1}{2}}$$

(m:electron mass, h:planck's constant). Since $\Delta S$ can be determined through an electric signal for vibrating the probe, and in addition since $\Delta I$ and $I$ can be measured easily by means of an electric circuit, it is possible to measure $\phi^{\frac{1}{2}}$ with small error factors. Further, since the current variation $\Delta I$ is divided by the current $I$ in Eq. (5) and as the result, even if the current $\Delta I$ is subjected to some variations, $\Delta I$ is varied also with a same rate as $I$, $\phi^{\frac{1}{2}}$ has a form hardly influenced by them, even if the precision of the constant current servo system is not high. As described above, by using Eq. (5) the object of measuring the tunnel barrier with a high precision described above can be achieved.

According to the present invention, the tunnel barrier information measuring means according to the principle described above can be combined with a scanning tunneling microscope (STM) measuring the superficial shape of the sample by using tunnel current or an apparatus similar to the STM measuring the superficial shape of the sample by using the force acting between the probe and the sample, the electrostatic capacitance, heat, light, sound, etc. so that information on the shape and the tunnel barrier information can be measured simultaneously. Further the display system displaying obtained information can be so constructed that the information on the superficial shape of the sample described above and the $\phi^{\frac{1}{2}}$ (or $\phi$) information are displayed on a same screen, superposed on each other. Furthermore, according to the present invention, a display system and a display method capable of dealing with a large amount of data or a number of kinds of data can be adopted.

DESCRIPTION OF THE PREFERRED EMBODIMENTS

Figure 1:
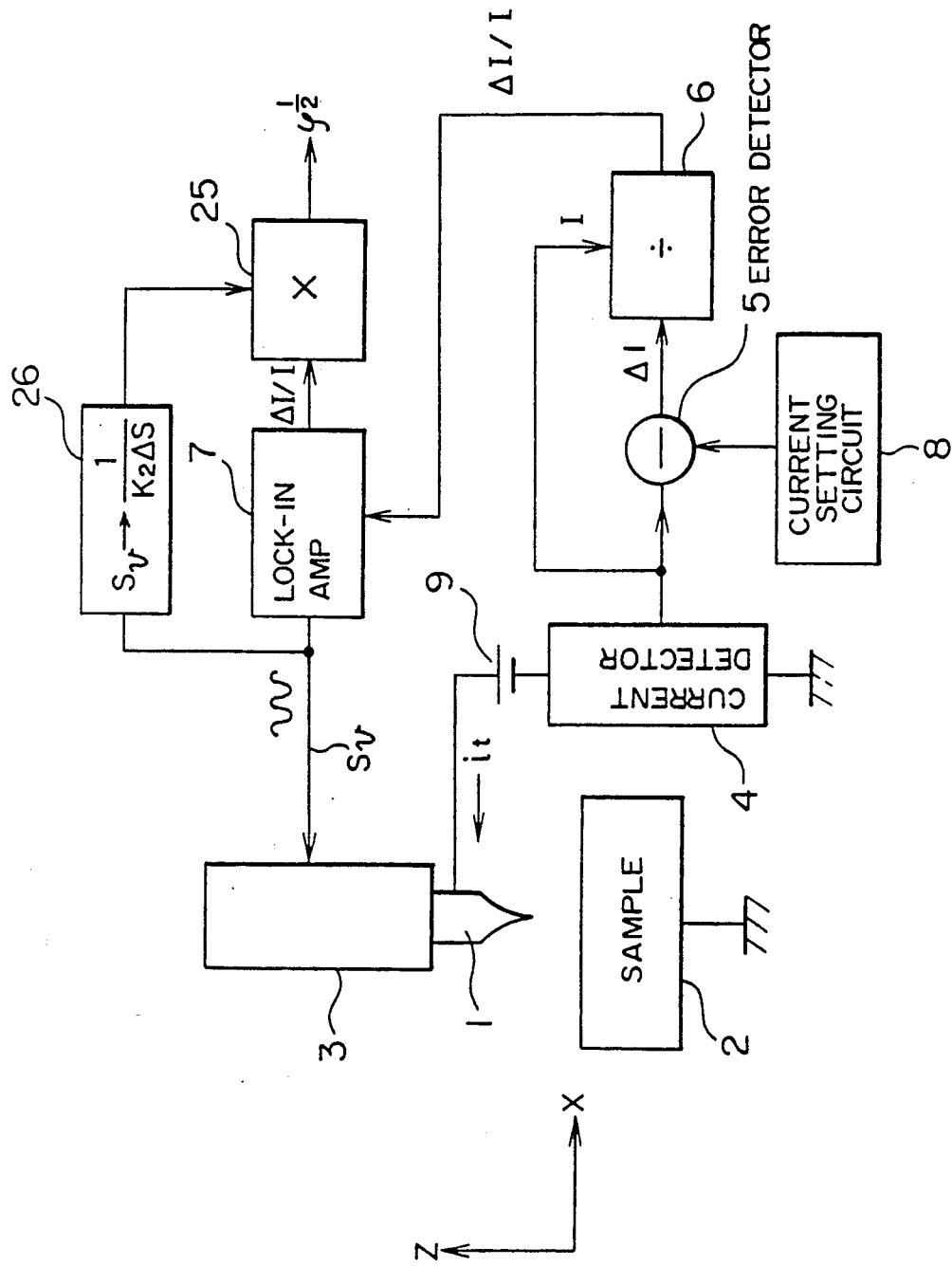
FIG. 1 is a block diagram for explaining the principle of the present invention.

The principle of the present invention will be explained, referring to FIG. 1. In the Figure, the probe 1 is brought close and opposite to the surface of the sample 2. It is so constructed that it is vibrated with an amplitude of $\Delta S$ in the Z axis direction of a piezo element 3. A bias power supply 9 supplies a bias voltage through the probe 1 and the sample 2. The tunnel current $\Delta I$ flowing through the probe 1 and the sample 2 is modulated by the vibration of the probe 1 and detected by a current detector 4. A current setting circuit 8 is a circuit for setting the DC component of the tunnel current I. As described later, the position of the probe 1 in the height in the Z axis direction is controlled by a servo mechanism so that the tunnel current I has a current intensity set by the current setting circuit 8, when the surface of the sample is scanned with the probe 1.

The difference between the tunnel current I detected by the current detector 4 and the current set by the current setting circuit 8 is formed in an error detector 5 and variations $\Delta I$ in the tunnel current I are detected. A divider 6 divides the variations $\Delta I$ in the tunnel current coming from the error detector 5 by the tunnel current $\Delta I$ from the current detector 4.

A lock-in amplifier 7 includes an oscillator and outputs a vibrating signal $S_v$ for giving the piezo element 3 vibration. At the same time it takes out a $\Delta I/I$ component synchronized with the frequency of the vibrating $S_v$ or having a predetermined phase difference with respect thereto from the output signal from the divider 6 and outputs it to a multiplier 25.

On the other hand, the vibrating signal $S_v$ is transformed into an amplitude $\Delta S$ of the vibration of the probe 1 by a transforming circuit 26 on the basis of electrostriction characteristics of the piezo element 3 and transformed further into a value of $1/(k_2\Delta S)$. The multiplier 25 multiplies the output $1/(k_2\Delta S)$ of the transforming circuit 26 by the output $\Delta I/I$ of the lock-in amplifier 7 and thus $\phi^{\frac{1}{2}}$ is calculated according to Eq. (5) described above (neglecting sign for the purpose of illustration.

In order that the tunnel current flows between the probe 1 and the sample 2, the probe 1 and the sample 2 should be so close to each other that the distance therebetween is about 10 Å. In this way it is possible to obtain information on the tunnel barrier ($\phi$) or the square root of the tunnel barrier ($\phi^{\frac{1}{2}}$).

Figure 2:
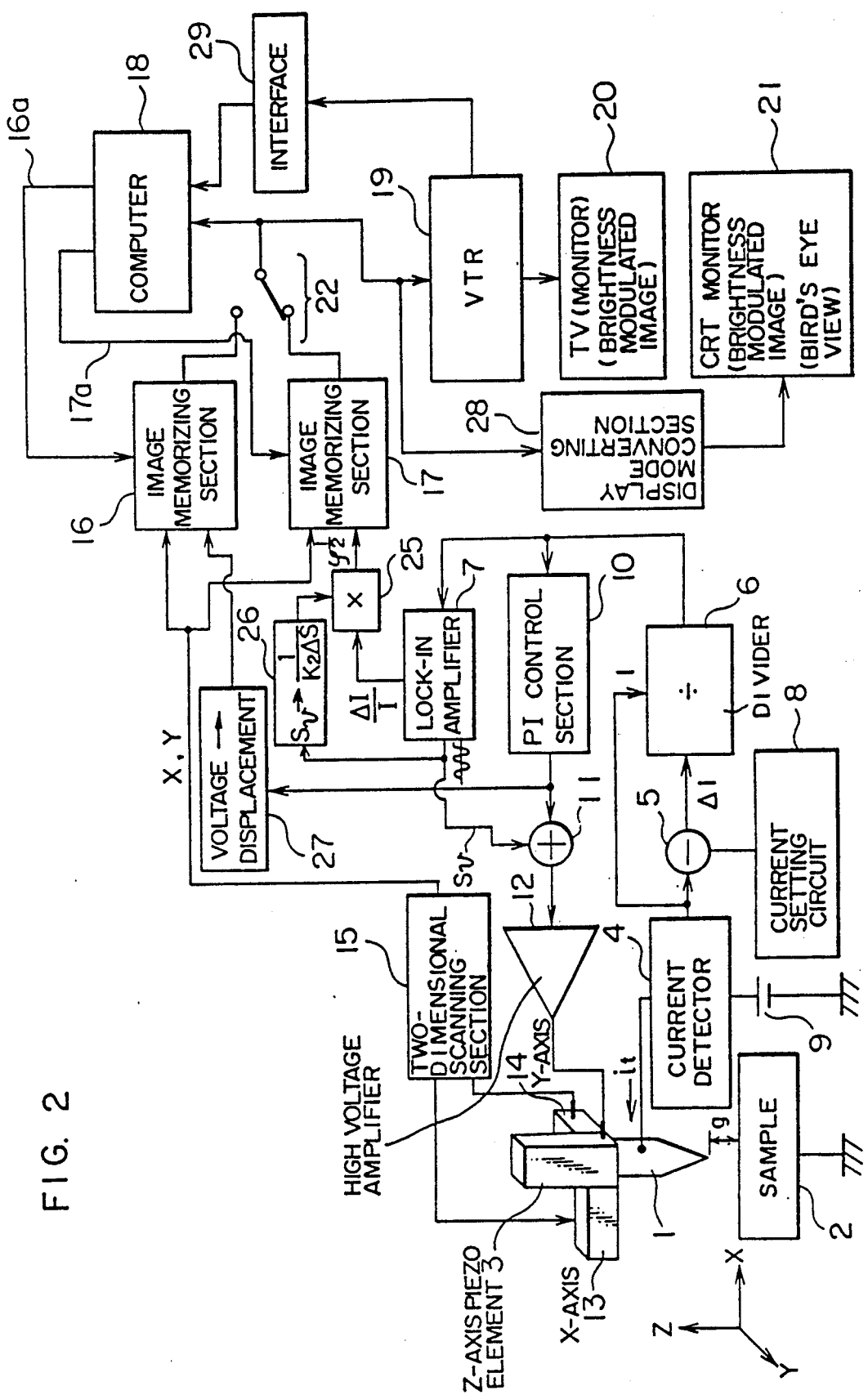
FIG. 2 is a block diagram indicating an embodiment, in which the present invention is applied to a scanning tunneling microscope.

Now the construction for obtaining the information on the tunnel barrier ($\phi$ or $\phi^{\frac{1}{2}}$) by using the control system for the scanning tunneling microscope, which is an embodiment of the present invention, will be explained, referring to FIG. 2. In FIG. 2, there are indicated, apart from the construction indicated in FIG. 1, also a constant current servo system for obtaining an STM image, which is a three-dimensional surface construction image of the surface of the sample, and a data processing and displaying section.

The constant current servo system is a system, which controls the tunnel current flowing through the probe 1 during the scanning so as to be a constant current, when the surface of the sample 2 is two-dimensionally scanned with the probe 1, and consists of the current detector 4 connected in series with the bias power supply 9, the error current detecting circuit 5, the divider 6, a PI controlling section 10, an adding circuit 11 and a high voltage amplifier 12. In the adding circuit 11 in such a constant current servo system the vibrating signal $S_v$ for vibrating the probe 1 is superposed on the servo signal. In this way, in addition to from the servo signal, the vibrating signal $S_v$ is applied to the Z axis piezo element to give the probe 1 vibration so that the tunnel gap g is varied with an amplitude of $\Delta S$.

As the result, the tunnel current $i_t$ flowing between the probe 1 and the sample 2 has a DC component approximately stabilized at a specified current intensity and an AC component due to the vibration of the probe 1. This AC component $\Delta I$ is detected by the error detector 5 and transformed into a $\Delta I/I$ signal, which is inputted in the lock-in amplifier 7. The lock-in amplifier 7 takes out the $\Delta I/I$ component, which is synchronized with the vibrating frequency of the vibrating signal $S_v$ or deviated by a predetermined phase therefrom, and sends it to the multiplier 25. The multiplier 25 forms the product of the signal $1/(k_2\Delta S)$ coming from the transforming circuit 26 and the signal $\Delta I/I$ coming from the lock-in amplifier 7 to obtain the $\phi^{\frac{1}{2}}$ information, which is stored in an image memorizing section 17.

On the other hand, the signal close to the DC component of the divider 6 represents an error from the tunnel gap corresponding to the aimed current intensity. An output signal is formed by a PI control section 10 so that the error becomes zero and the position of the probe 1 in the Z axis direction is constant-current-servo controlled through the adding circuit 11 and the high voltage amplifier 12. Owing to this constant-current-servo control operation the probe 1 is moved two-dimensionally along fine unevenness on the surface of the sample. Consequently the output signal of the PI control section 10 represents information on the surface of the sample in the height (Z-axis) direction. This signal is stored in the image memorizing section 16. In this case, the relation between the elongation of the Z axis piezo element 3 and the applied voltage or the applied electric charge is measured previously, and since it should be converted into the displacement in the Z axis direction on the basis of these data, the voltage applied to the piezo element is stored in the image memorizing section 16 after having been converted into the displacement of the probe. Further the PI control section 10 consists of a proportional member and an integral member connected in series or parallel, whose frequency region is extended so as to be able to servo the probe up to a higher frequency region than a control system composed only of an integrator. However, instead of the PI control section 10, a control system including only an integrator or a PID control system including further a differential member can be applied also to the control system in the present embodiment. Still further, from the standpoint of obtaining the $\phi^{\frac{1}{2}}$ information and the height information simultaneously, it is desirable that the frequency response region of the constant-current-servo system is lower than the vibrating frequency coming from the lock-in amplifier 7.

As described above, after having brought the probe 1 close to the surface of the sample 2 so that the tunnel gap g is about 10 Å (in the Figure the means for establishing the gap being omitted) and set it so as to obtain the constant-current-servo and the $\phi^{\frac{1}{2}}$ information, an X- and a Y-scanning signal are inputted from the two-dimensional scanning section 15 in an X axis piezo element 13 and a Y axis piezo element 14, respectively, and at the same time they are inputted also in the image memorizing sections 16 and 17, respectively, as address information. The two-dimensional scanning section 15 has, as usually known, an X and a Y counter counting increments from a clock generator so as to adapt the scanning section 15 to the X axis and the Y axis scanning terminals, through which the outputs of these counters are outputted as addresses of X and Y, respectively, and terminals through which they are outputted to the X axis and the Y axis piezo elements 13 and 14, respectively, after having DA converted the outputs of these counters. The surface of the sample is raster-scanned with the probe 1 by means of the X axis and the Y axis piezo element 13 and 14 driven by the X and the Y scanning signal, respectively, and in this way it is possible to obtain the $\phi^{\frac{1}{2}}$ information together with the three-dimensional shape information on the surface of the sample by using the (X, Y) addresses and the height information. Further, instead of the three-dimensional movement of the probe, the sample 2 may be moved three-dimensionally or the probe and the sample may both move. What is essential is that the probe 1 and the sample 2 are displaced three-dimensionally with respect to each other. The three-dimensional shape information is stored in the image memorizing section 16, while the two-dimensional information and $\phi^{\frac{1}{2}}$ are stored in the image memorizing section 17. After having obtained the data, either one of the signals is displayed in a VTR 19 or a TV monitor 20 as a brightness modulated image of the height information or the $\phi^{\frac{1}{2}}$ information. Still further it is possible also to convert the height information or the $\phi^{\frac{1}{2}}$ information into image signals suitable for a required display mode in a display mode converting section 28 and to display it in a CRT monitor 21 in the form of a brightness modulated image similar to that obtained by means of the TV monitor 20 or a bird's-eye view. Further the obtained data may be subjected to data processing in a computer 18 for effecting a contour line display, a shadow processing display or a stereoscopic display other than the display similar to that described above. Still further it is possible also to subject the obtained data to FFT (fast Fourier transformation) processing, smoothing processing, etc. or to enable base line regulation, gain regulation, further window processing (partial enlargement, partial processing), or cross-sectional display between two points of specified coordinates. Furthermore, since the display device in the computer is not of high quality, it is desirable to use the TV monitor 20 or the CRT monitor 21 also for displaying the data processed by means of the computer. In this case, the method is the most advantageous, by which the data processed by means of the computer are stored once again in either one of the image memorizing sections 16 and 17 through lines 16a and 17a, respectively, and they are displayed thereafter. However it is also conceivable to dispose separately an image memorizing section (not shown in the Figure) exclusively used therefor. In a practical embodiment, either one of them may be used. In addition, since a large amount of data can be stored in the VTR 19, it is convenient to store the data therein. The VTR may be either analogue or digital. However there can be a case where it is desired to deal with these raw data by means of the computer. In this case, the signal of the VTR 19 is inputted in the computer through an interface 29 used exclusively for the VTR and displayed with TV monitor 20 and the CRT monitor 21 through the image memorizing section according to the procedure described above after the data processing. At this time data, which should be conserved, may be stored in the VTR 19 or in the memory of the computer 18.

Figure 3:
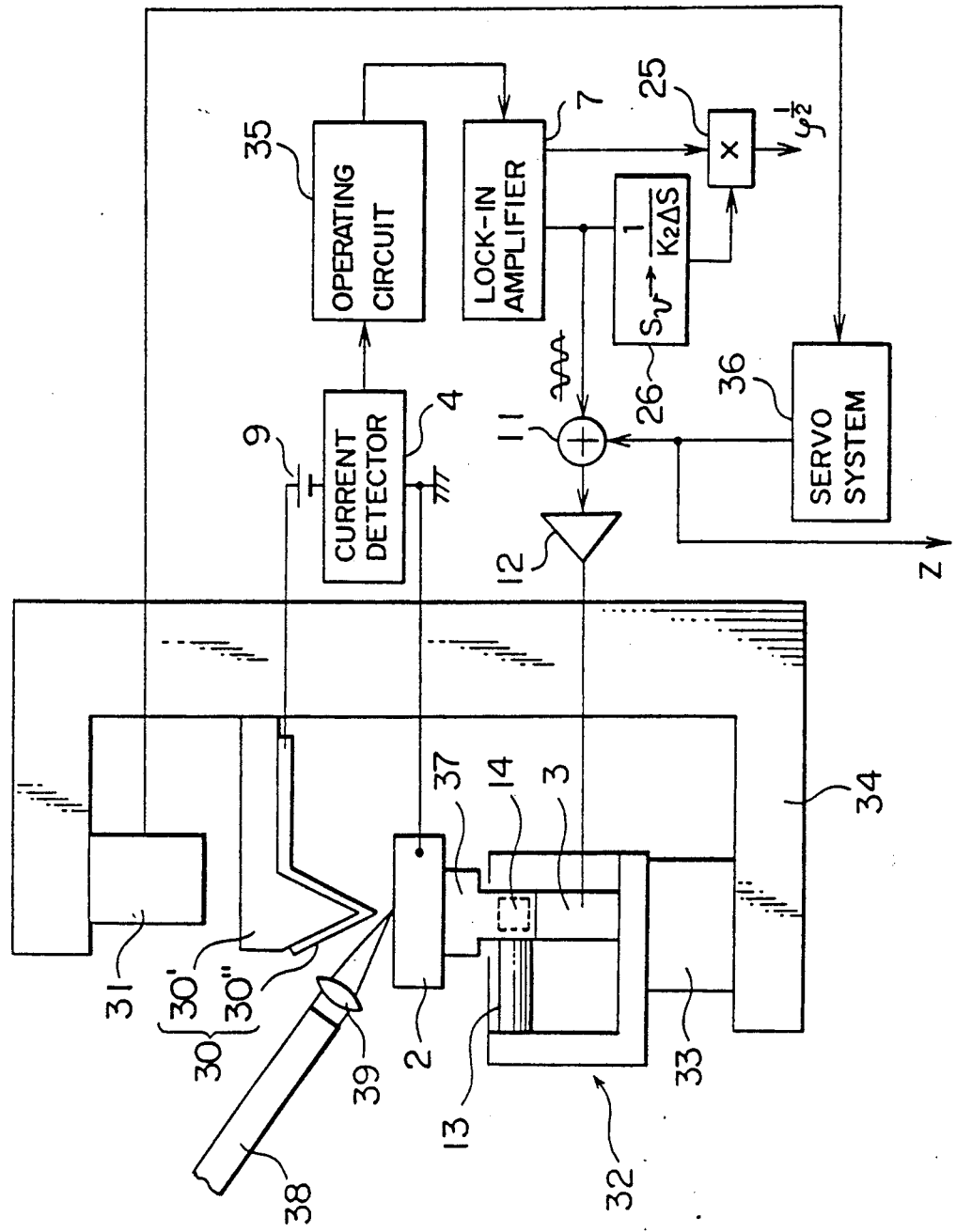
FIG. 3 is a block diagram indicating an embodiment, in which the present invention is applied to an atomic force microscope.

FIG. 3 shows an example, in which the present invention is applied to an atomic force microscope. The mechanism section consists of detecting sections 30 and 31 detecting a constant atomic force (repulsive or attractive force between atoms at the extremity of the probe 30 and atoms on the sample), a tripod type scanner 32 controlling the sample three-dimensionally and a rough regulation mechanism 33 having a function of the visual field selection and a function of bringing the probe close to the sample. The detecting system is composed of the probe 30 consisting of a cantilever 30', whose extremity is covered by a conductive section 30'' as indicated in the Figure, and a non-contact type displacement meter (cantilever deflection detector) 31 for measuring the cantilever displacements thereof with a high precision to detect the force. A meter, to which the principle of the scanning tunneling microscope is applied, or a capacity type displacement meter, a laser interferometer, etc. on the market is conceivable for this non-contact type displacement meter 31 used at this time. The tripod type scanner 32 combines the Z axis, the X axis and the Y axis piezo-elements 3, 13, 14 to control the sample 2 through a sample table 37, as indicated in the Figure. By this method the mechanism is so constructed that the sample is three-dimensionally controlled, which is reverse with respect to the mechanism by the method, by which the probe 1 is three-dimensionally controlled, as indicated in FIG. 2. Further the sample table 37 should be made of an insulator.

It works as follows. At first, the sample 2 is brought close to the probe 30 by using a well-known rough regulation mechanism mounted on a base 34. At this time it is desirable that the non-contact type displacement meter 31 (servo-controlled so that the force is kept to be constant), a servo system 36, an adding circuit 11, a high voltage amplifier 12, and the Z axis piezo element 3 are driven. This is because the probe 30 should not collide with the sample 2, when they are brought rapidly close to each other. Next, when extremely small atomic force is detected, the elements described above are driven so that the two-dimensional scanning is effected, while keeping the detected force at a desired value. In this state, when a signal vibrating the sample 2 in the Z axis direction is inputted from the lock-in amplifier 7 through the adding circuit 11, the sample 2 is vibrated and a tunnel current modulated by an electric circuit consisting of the conductive section 30', the bias power supply 9 and the current detector 4. This is detected by the current detector 4 and ($\Delta I/I$) is detected by an operating circuit 35 consisting of the current setting circuit 8, the error detector 5 and the dividing circuit 6, which is similar to that indicated in FIG. 1 to obtain the $\phi^{\frac{1}{2}}$ information by means of the lock-in amplifier 7, the transforming circuit 26 and the multiplier 25. On the other hand it is possible to obtain information on the height from the output Z of the servo system 36. Although, in FIG. 3, the two-dimensional scanning signals for the X axis and the Y axis, the image memorizing section, the display section, the computer, etc. are omitted, in the same way as explained, referring to FIG. 2, it is possible to obtain the three-dimensional shape information and the two-dimensional information on $\phi^{\frac{1}{2}}$ simultaneously by setting the function described above. As explained above, the object of the present invention can be achieved by combining the shape measuring means using the probe with means for measuring the tunnel barrier ($\phi^{\frac{1}{2}}$) information as in the embodiment indicated in FIG. 1. Concretely speaking, apart from the device utilizing the tunnel current indicated in FIG. 2 and the device utilizing the atomic force indicated in FIG. 3, the $\phi^{\frac{1}{2}}$ information measuring means may be combined with another well known superficial shape measuring device utilizing electro-static capacitance, light, heat and sound. Further it is also in the scope of the present invention to measure the tunnel current, while irradiating the sample 2 with radiation (X-ray, ultraviolet ray, laser light, visible light and infrared ray) by using optical means such as an optical fiber 38 and a focusing lens 39, etc.

Figure 4:
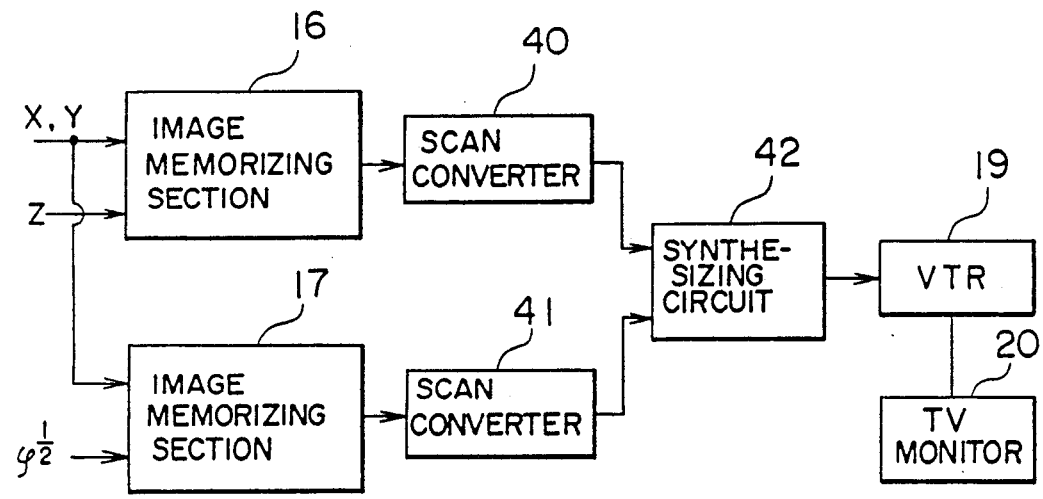
FIG. 4 is a block diagram indicating a circuit construction for obtaining signals for an image, in which a three-dimensional superficial shape image and a $\phi^{\frac{1}{2}}$ distribution image are superposed on each other.

FIG. 4 shows a concrete example for realizing a display formalism more easily understood of the tunnel barrier ($\phi$) pr $\phi^{\frac{1}{2}}$ information and the height information thus obtained. Here image information obtained in the manner, as indicated in FIG. 2, is displayed in a TV monitor 20 by taking out analogue image signals from the image memorizing sections 16 and 17 through scan converters 40 and 41, respectively, and converting them into color image signals in a synthesizing circuit 42. In this way very useful information can be obtained, because the distribution of the tunnel barrier $\phi^{\frac{1}{2}}$ can be known simultaneously together with the fine structure of the surface, e.g. if shape information of the surface is displayed in green and the $\phi^{\frac{1}{2}}$ information in red. Apart therefrom, combinations of different colors, combinations of the bird's-eye representation and the brightness modulation representation with colors, etc. are conceivable. Further the stereoscopic representation and the color representation as well as the stereoscopic representation and the bird's-eye representation are possible owing to the processing by means of the computer, apart from the representations described above.

Figure 5:
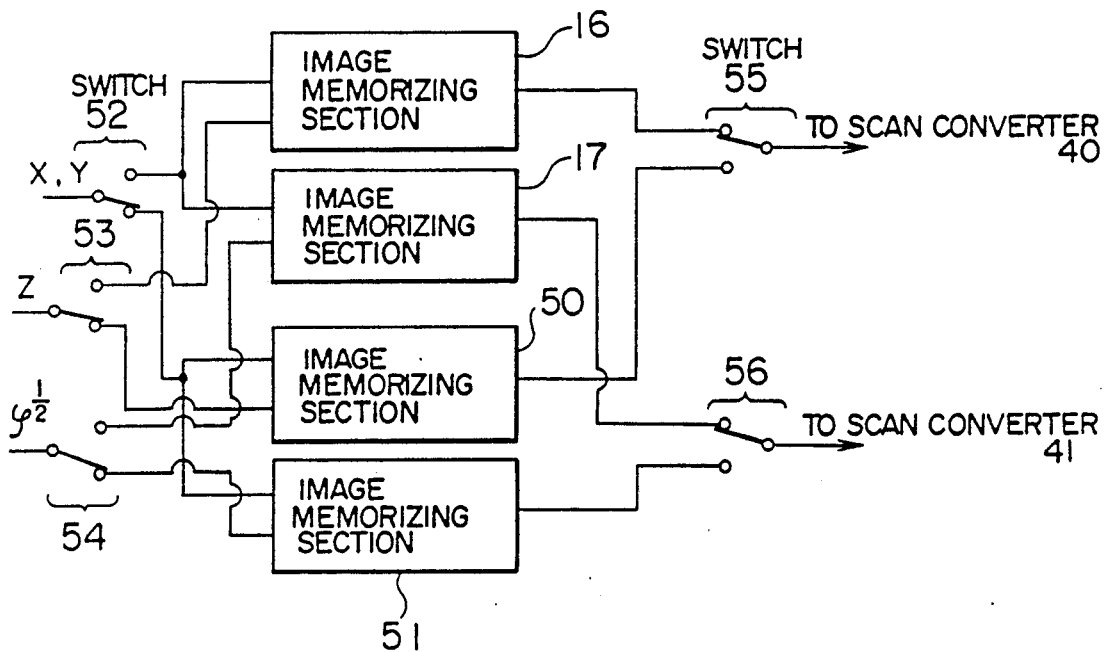
FIG. 5 is a block diagram indicating a circuit construction for observing continuously the three-dimensional superficial shape image and the $\phi^{\frac{1}{2}}$ distribution image.

On the other hand, in the case of the observation of the surface by a high speed scanning, there is known a method, by which raster scanning lines are renewed for every line in the display. However, in this case, this method is inconvenient, in the case where well arranged images are still only during a small period of time in the display. Therefore every still image is outputted during a period of time, during which one image is obtained (raster scanning of one image), and thereafter data recorded in the other image memorizing section are inputted and displayed by switching the signal path before the scan converters indicated in FIG. 4. In this way it is possible to display a still image for a long time, which is convenient. FIG. 5 shows a concrete example for realizing this procedure. In addition to the construction indicated in FIG. 4 there are disposed image memorizing sections 50 and 51 and further switches 52, 53 and 54 on the data input side as well as switches 55 and 56 on the data output side. The Figure shows a state, where during a period of time where the three-dimensional shape information is recorded in the image memorizing section 50 and the $\phi^{\frac{1}{2}}$ information in the image memorizing section 51, information stored previously in the image memorizing section 16 and that stored previously in the image memorizing section 17 are transmitted to the scan converters 40 and 41, respectively. When the storing in the image memorizing sections 50 and 51 is terminated, the switches 52 to 56 are switched over to the respective contacts on the opposite side and recording is effected again in the image memorizing sections 16 and 17. During this period of time the display is effected by outputting the memory contents in the image memorizing sections 50 and 51. Although this example concerns the combinations of the height information with the $\phi^{\frac{1}{2}}$ information, combinations of other physical quantities such as tunnel current, capacitance, sound, light, heat, force, etc. and further combinations of more than two of them are conceivable. Still further the present invention can be applied to the case of the display only of the three-dimensional shape information (STM image). These don't depart from the scope of the present invention.

In addition, although it has not been shown as a concrete example, it is easily understood that it is possible to square the $\phi^{\frac{1}{2}}$ information and to display it in the form of information. Further, since the $\phi^{\frac{1}{2}}$ distribution is obtained, it is possible to obtain more precise shape information by executing correction calculation on the measured height information, starting from values close to a true value in the state where $\phi^{\frac{1}{2}}$ is constant, using Eq. (2), a formula representing the tunnel current, a formula representing the field emission current, etc.

According to the present invention, since it is possible to measure the three-dimensional shape of the surface of the sample and at the same time to measure the distribution of the tunnel barrier ($\phi$) or $\phi^{\frac{1}{2}}$ on a surface, even if the surface is composed of different kinds of elements, it is possible to distinguish them. Further, according to the present invention, since it is possible to obtain data at the same time as a usual surface measurement, the measurement can be effected in an extremely short time with respect to the tunnel electron spectroscopy using tunnel current. Since the measurement can be effected in a time shorter than half the time required by the method using the tunnel current, influences of the drift of the sample are reduced, which is advantageous. Furthermore, since the measurement can be executed with a very small current with respect to that required by the tunnel electron spectroscopy, it is possible to obtain data very stably.

In addition, also for the display, it is possible to form a synthesized image by combining a superficial shape image with a $\phi^{\frac{1}{2}}$ or $\phi$ image and in this case to obtain properties of matter with a high precision.

We claim:

1. A surface microscope comprising:
    means for bringing a probe close to a surface of a sample to scan it therewith;
    means for detecting a physical quantity generated between said probe and said sample to measure the superficial shape of said sample and to provide an information signal representing the superficial shape of said sample;
    means for varying the gap between said probe and said sample;
    means for detecting a variable component of said physical quantity varying, accompanied by variations in the gap by said means for varying same;
    dividing means for calculating the ratio of said variable component of said physical quantity to said physical quantity;
    means for calculating tunnel barrier information, based on the quotient obtained by said dividing means; and
    display means for displaying at least one of the superficial shape of the sample measured by said means for measuring the superficial shape of said sample and the tunnel barrier information calculated by said means for calculating same.

2. A surface microscope according to claim 1, wherein said means for calculating tunnel barrier information includes means for calculating a value proportional to the inverse of the displacement of the gap displaced by said means for varying the gap and multiplying means for multiplying said proportional value coming from said means for calculating the value by said quotient coming from said dividing means.

3. A surface microscope according to claim 2, wherein said means for calculating tunnel barrier information includes further means for detecting a component of said quotient having a predetermined phase relation to the variations in the gap displaced by said means for varying the gap from said quotient coming from said dividing means.

4. A surface microscope according to claim 3, wherein said means for detecting said quotient component is a lock-in amplifier.

5. A surface microscope according to claim 1, wherein said physical quantity is tunnel current.

6. A surface microscope according to claim 5, wherein said means for calculating tunnel barrier information calculates tunnel barrier information $\phi^{\frac{1}{2}}$ by using the following equation;

$$\phi^{\frac{1}{2}} = -\left(\frac{1}{K_2 \Delta S}\right)\left(\frac{\Delta I}{I}\right)$$

where $K_2$ is a constant; $\Delta S$ is the variation in said gap; I is the intensity of said tunnel current; and $\Delta I$ is the variable component of said tunnel current.

7. A surface microscope according to claim 1, wherein said means for measuring the superficial shape of said sample includes means for servo-controlling said probe so that the low frequency component of said detected physical quantity has a predetermined value; means for detecting a superficial shape signal on the basis of a servo signal coming from said servo control means; and means for controlling the gap between said probe and said sample on the basis of said servo signal.

8. A surface microscope according to claim 7, wherein said servo control means includes physical quantity setting means for setting said physical quantity; means for detecting an error between the value set by said physical quantity setting means and said detected physical quantity; and means for outputting the servo signal on the basis of the error detected by said error detecting means.

9. A surface microscope according to claim 8, wherein said outputting means includes proportional-integral control means for outputting a servo signal consisting of a part proportional to a signal based on said error and a part obtained by integrating same.

10. A surface microscope according to claim 1, further comprising means for irradiating the surface portion of said sample forming said gap with radiation.

11. A surface microscope according to claim 10, wherein said radiation is any one of X-ray radiation, ultraviolet radiation, laser light radiation, visible light radiation, and infrared radiation.

12. A surface microscope according to claim 1, wherein said physical quantity includes at least one of tunnel current and field emission current.

13. A surface microscope according to claim 1, wherein said physical quantity is atomic force acting between said probe and said sample.

14. A surface microscope according to claim 13, wherein said means for measuring the superficial shape of said sample includes means for detecting said atomic force; means for servo-controlling said probe so that the low frequency component of said detected signal has a predetermined value; means for detecting a superficial shape signal on the basis of a servo signal coming from said servo control means; and means for controlling the gap between said probe and said sample on the basis of said servo signal.

15. A surface microscope according to claim 14, wherein said atomic force detecting means is a non-contact type displacement meter for detecting the displacement of said probe.

16. A surface microscope according to claim 1, wherein said display means includes means for superposing information on the superficial shape of said sample on said tunnel barrier information and means for displaying the signal obtained by superposition in said superposing means.

17. A surface microscope according to claim 16, wherein said superposing means includes a first image memorizing section for storing the superficial shape signal measured by said means for measuring the superficial shape of said sample; a second image memorizing section for storing the tunnel barrier information coming from said tunnel barrier information calculating means; and a synthesizing circuit for synthesizing a signal from the signals coming from said first and said second image memorizing section.

18. A surface microscope according to claim 1, wherein said display means includes at least one image memorizing section for storing either one of said information signal representing the superficial shape of said sample and said tunnel barrier information signal; and a display device for displaying the image information stored in said image memorizing section.

19. A surface microscope according to claim 18, wherein said display means is a CRT monitor.

20. A surface microscope according to claim 18, wherein said display means includes a VTR for recording signals stored in said image memorizing section and a TV monitor for displaying the signals recorded in said VTR.

21. A surface microscope according to claim 20, wherein said display means includes further a computer for data-processing the signals recorded in said VTR and means for storing the signals data-processed by said computer in said image memorizing section.

22. A surface microscope according to claim 1, wherein said display means includes at least two image memorizing sections; means for selecting one of said two image memorizing sections and storing either one of said information signal representing the superficial shape of said sample and said tunnel barrier information signal in said selected image memorizing section, and for storing the nonselected image information signal in the other image memorizing section; and a display device for displaying image information stored in the other of said image memorizing sections, which has not been selected by said means.

23. A surface microscope according to claim 1, wherein said display means includes at least a first and a second image memorizing section for storing the information signal coming from said means for measuring the superficial shape of said sample; at least a third and a fourth image memorizing section for storing the tunnel barrier information coming from said tunnel barrier information calculating means; means for storing said signal on the superficial shape of said sample in one of said first and said second image memorizing sections, when signals are read out from the other of said first and said second image memorizing sections, and at the same time storing said tunnel barrier information signal in one of said third and said fourth image memorizing sections when signals are read out from the other of said third and said fourth image memorizing sections; a synthesizing circuit for synthesizing a signal from said signals read out from said other of said third and said fourth image memorizing sections; and a display device for displaying the synthesized signal coming from said synthesizing circuit.

* * * * *